United States Patent
Liou

[11] Patent Number: 5,129,106
[45] Date of Patent: Jul. 14, 1992

[54] INFLATABLE HEADBAND

[76] Inventor: Jiann-Hwa Liou, 10F-3, No. 114, Ai-Kuo E. Rd., Taipei, Taiwan

[21] Appl. No.: 712,702

[22] Filed: Jun. 10, 1991

[51] Int. Cl.$^5$ .............................................. A42C 5/02
[52] U.S. Cl. ........................................ 2/411; 2/413; 2/DIG. 11
[58] Field of Search .................. 2/10, 12, 13, 171, 181, 2/181.6, 181.8, 182.8, 183, 197, 410, 411, 412, 413, 417, 418, 420, DIG. 10, DIG. 11

[56] References Cited

U.S. PATENT DOCUMENTS

| | | | |
|---|---|---|---|
| 606,982 | 7/1898 | Smyth | 2/171 |
| 2,051,714 | 8/1936 | Huntington | 2/182 |
| 2,121,702 | 6/1938 | Larkin | 2/413 |
| 2,262,142 | 11/1941 | Karmsen | 2/10 |
| 3,351,963 | 11/1967 | Rapisarda | 2/181.6 |
| 4,393,519 | 7/1983 | Nicastro | 2/DIG. 11 |
| 4,616,367 | 10/1986 | Jean | 2/DIG. 11 |
| 4,712,254 | 12/1987 | Daigle | 2/DIG. 11 |
| 4,852,189 | 8/1989 | Duggan | 2/13 |
| 4,988,093 | 1/1991 | Forrest | 2/413 |
| 5,031,246 | 7/1991 | Kronenberger | 2/183 |

FOREIGN PATENT DOCUMENTS

| | | | |
|---|---|---|---|
| 2717234 | 11/1978 | Fed. Rep. of Germany | 2/412 |
| 2823370 | 12/1979 | Fed. Rep. of Germany | 2/413 |
| 2134370 | 8/1984 | United Kingdom | 2/411 |

*Primary Examiner*—Werner H. Schroeder
*Assistant Examiner*—Diana L. Biefeld
*Attorney, Agent, or Firm*—Fleit, Jacobson, Cohn, Price, Holman & Stern

[57] ABSTRACT

An inflatable headband comprising an elongated, strap-like air-bag body covered with a layer of velvet or cotton cloth, having a pair of connecting elements at two opposite ends, a plurality of ring holes made through said air-bag body by the process of heating and sealing or embossed stripes formed on said air-bag body by the process of heat pressing, a pair of spaced eye bars extending from the side edge thereof, and at least one air valve. The air-bag body is inflated and then fastened around the head by the pair of connecting elements. Ornamental items are fastened in the ring holes to make the structure more attractive. The two spaced eye-bars are provided for holding user's eyeglass on the head.

3 Claims, 4 Drawing Sheets

INFLATABLE HEADBAND

BACKGROUND OF THE INVENTION

The present invention relates to headbands and relates more particularly to a headband made of an elongated, strap-like air-bag covered with a layer of velvet or cotton cloth worn around the head, after having been inflated, for ornamental or other purposes.

In sports, people may use a headband wearing around the head to bind up the hair and at the same time, to stop beads of sweat from flowing toward the eyes. A conventional headband is simply a ring-shaped strap made of elastic material and provided for the aforesaid purposes only.

SUMMARY OF THE INVENTION

It is one object of the present invention to provide a headband which is formed of a strap-like air-bag having connecting means at two opposite ends for arranging into a ring-shaped structure for wearing around the head comfortably, to bind up the hair, to protect the eyes from direct sunlight and, to stop the beads of sweat from flowing toward the eyes.

It is another object of the present invention to provide a headband which has means to hold user's eyeglass firmly on the head.

It is still another object of the present invention to provide a headband which has means to prohibit it from being pleated when it is arranged into a ring-shaped structure for wearing around the head.

It is still another object of the present invention to provide a headband which has means to hold ornamental items.

It is still another object of the present invention to provide a headband which can be alternatively used as an inflatable toy or ice-bag.

DETAILED DESCRIPTION OF THE PREFERRED EMBODIMENTS

Figure 1:
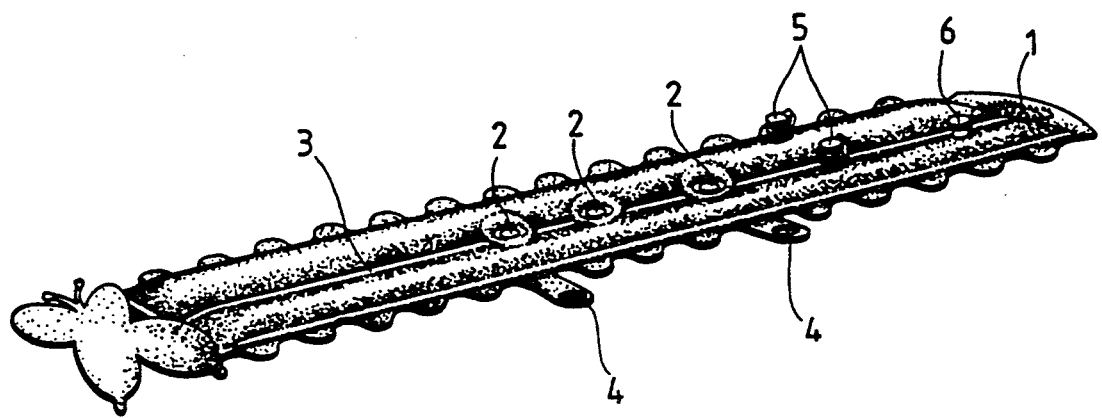
FIG. 1 is a perspective view of the present invention.
Figure 2:
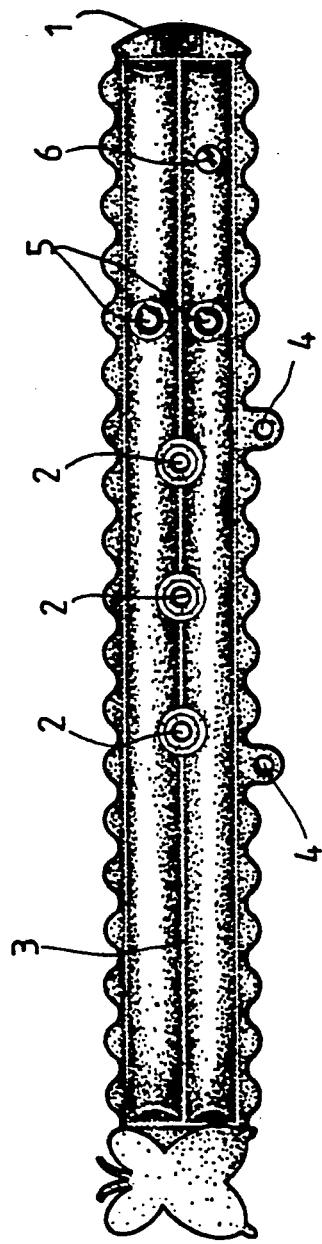
FIG. 2 is a front view thereof.
Figure 3:
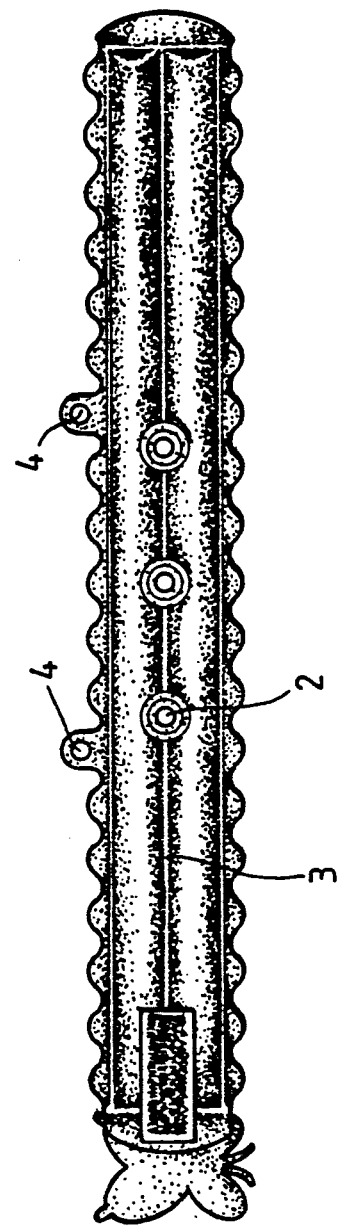
FIG. 3 is a rear view thereof.

Referring to FIGS. 1, 2 and 3, an inflatable headband in accordance with the present invention is generally comprised of an elongated, strap-like air-bag body covered with a layer of velvet or cotton cloth, having connecting elements 1 at two opposite ends, a plurality of ring holes 4 made therethrough by the process of heating and sealing, a pair of spaced eye bars 4 projecting from the side edge thereof, and at least one air valve 5. Further, instead of the ring holes 2, one or more embossed stripes 3 may be made on the air-bag body of the headband by the process of heat pressing. As an alternate form, ring holes 2 and embossed stripes 3 may be simultaneously made on the air-bag body of the headband. Through the at least one air valve 5, the headband is inflated. After inflation, the headband can be firmly worn around the head by fastening up the two connecting elements 1. Regular strap-like air-bag may be pleated when it is bent into a ring-shaped structure. This problem has been eliminated in the present invention by means of the arrangement of the ring holes 2 or the embossed stripes 3. The pattern of the embossed stripes 3 may be variously embodied. For examples: an elongated, embossed stripe may be made on the headband in longitudinal direction (as shown in FIGS. 1 through 5) or a plurality of embossed stripes may be made on the headband and alternatively intersected with one another.

Figure 4:
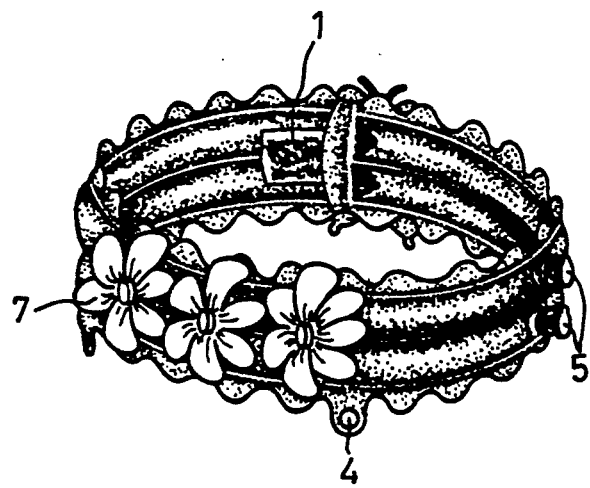
FIG. 4 illustrates that the headband is inflated and fastened into a ring-shaped structure ready to wear around the head.
Figure 5:
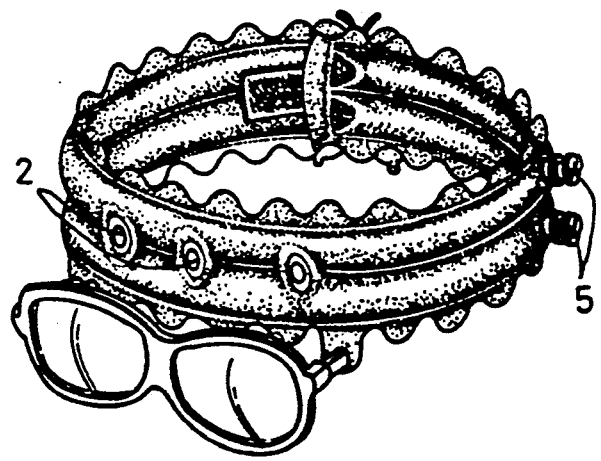
FIG. 5 illustrates that an application of the headband of the present invention to hold a pair of eyeglasses.
Figure 6:
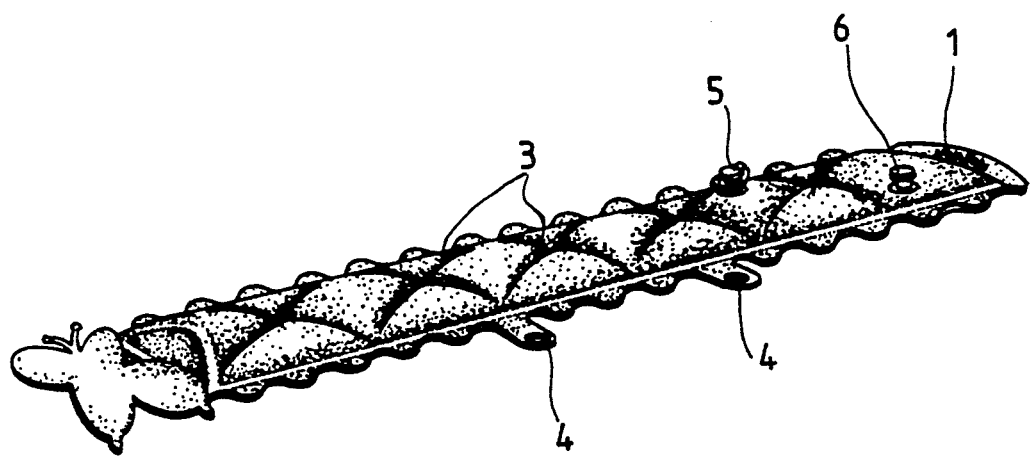
FIG. 6 illustrates an alternate form of the present invention.

When in use, as shown in FIG. 4, ornamental items 7 may be fastened in the ring holes 2 to make the headband more attractive. Further, as shown in FIG. 5, one's eyeglasses may be fastened in the pair of spaced eye bars 4 and then with the headband put on one'head altogether. Therefore, the eyeglasses can be firmly retained by the headband in place and will not fall from the head even during a fierce combat.

Further, a water valve 6 or like structure may be made on the headband through which the headband can be filled with fluid. After having been filled with fluid, the headband may be cooled in a refrigerator so that it can be used as an ice-bag to be applied to the body to reduce a swelling and ease pain.

Further, the air-bag body of the headband may be made in a double or multi-layer structure defining therein a plurality of independent air chambers so that it can still perform properly when either air chamber is damaged.

What is claimed is:

1. A headband comprising an elongated, strap-like air-bag body covered with a layer of cloth, having a pair of connecting elements at two opposite ends, a plurality of sealed ring holes made through said air-bag body, a pair of spaced projecting strips extending from one side edge of the air-bag body, and at least one air valve, whereby said air-bag body can be filled with air through said air valve and then fastened around a user's head by fastening said pair of connecting elements together, said ring holes and projecting strips being selectively usable for fastening objects to the headband.

2. The headband of claim 1, wherein said pair of connecting elements are made of a loop and pile-type fastening strip.

3. The headband of claim 1, wherein said two spaced, projecting strips have each a hole respectively provided for fastening bows of a pair of eyeglasses.

* * * * *